United States Patent [19]

Brackett

[11] Patent Number: 5,375,566
[45] Date of Patent: Dec. 27, 1994

[54] INTERNAL COMBUSTION ENGINE WITH IMPROVED CYCLE DYNAMICS

[76] Inventor: Douglas C. Brackett, P.O. Box 306, Portland, Me. 04112

[21] Appl. No.: 149,032

[22] Filed: Nov. 8, 1993

[51] Int. Cl.5 ............................................. F16H 21/18
[52] U.S. Cl. ................................. 123/55.5; 123/197.1; 74/49; 74/50
[58] Field of Search ............... 123/55 R, 56 R, 56 A, 123/56 AA, 56 BC, 56 BA, 56 AC, 70 R, 197.1, 197.2, 56 B; 74/49, 50

[56] References Cited

U.S. PATENT DOCUMENTS

| | | |
|---|---|---|
| 130,371 | 8/1872 | Hendryx . |
| 139,499 | 6/1873 | Doolittle . |
| 283,558 | 8/1883 | Baumgarten . |
| 637,450 | 11/1899 | Doolittle . |
| 1,349,660 | 8/1920 | Buhl . |
| 1,505,856 | 8/1924 | Briggs . |
| 1,687,425 | 10/1928 | Briggs . |
| 2,312,057 | 2/1943 | Williams .................. 74/49 |
| 2,366,237 | 1/1945 | Clausen . |
| 2,513,514 | 7/1950 | Poage . |
| 3,087,342 | 4/1963 | Caddell . |
| 3,827,237 | 8/1974 | Linder et al. ............. 60/274 |
| 3,961,607 | 6/1976 | Brems .................... 123/78 R |
| 4,073,196 | 2/1978 | Dell ....................... 123/197.2 |
| 4,270,395 | 6/1981 | Grundy .................... 74/49 |
| 4,339,960 | 7/1982 | Senft ....................... 74/50 |
| 4,370,901 | 2/1983 | Bolen ....................... 74/44 |
| 4,408,578 | 10/1983 | Konther et al. ............ 123/56 R |
| 4,459,945 | 7/1984 | Chatfield ................... 123/56 C |
| 4,463,710 | 8/1984 | McWhorter ............... 123/48 B |
| 4,485,768 | 12/1984 | Heniges .................... 123/48 B |
| 4,512,291 | 4/1985 | Kirk ........................ 123/56 BC |
| 4,584,972 | 4/1986 | Jayne et al. ............... 123/56 C |
| 4,598,672 | 7/1986 | Jayne et al. ............... 123/56 BC |
| 4,685,342 | 8/1987 | Brackett ................... 74/50 |
| 4,779,472 | 10/1988 | Brackett ................... 74/50 |
| 4,803,890 | 2/1989 | Giuliani et al. ............ 123/197.1 |
| 4,887,560 | 12/1989 | Heniges . |
| 4,915,019 | 4/1990 | Hovaguimian ............ 74/435 |
| 4,977,864 | 12/1990 | Grant ...................... 123/50 B |
| 4,979,427 | 12/1990 | Pfeffer et al. ............. 123/48 B |
| 5,259,256 | 11/1993 | Brackett ................... 74/49 |

FOREIGN PATENT DOCUMENTS

| | | |
|---|---|---|
| 336037 | 6/1920 | Germany . |
| 584082 | 8/1933 | Germany . |
| 112767 | 10/1918 | United Kingdom . |
| 533047 | 2/1941 | United Kingdom . |

*Primary Examiner*—David A. Okonsky
*Attorney, Agent, or Firm*—Ralph W. Selitto, Jr.

[57] ABSTRACT

A reciprocating piston internal combustion engine has a scotch yoke-type motion translator. The engine is horizontally opposed with each shuttle having a pair of pistons attached at the ends of a pair of oppositely extending arms. A centrally located aperture in the shuttle accommodates the crankpin and incorporates a pair of rack blocks bolted to the shuttle. The rack blocks mesh with mating epicycloidal/hypocycloidal sectors rotatably mounted upon a crankpin and forming the interface between crankshaft and shuttle. The cycle dynamics of the engine may be matched to the thermodynamics of a selected power cycle and fuel by adjusting the shape of the sectors and racks.

20 Claims, 13 Drawing Sheets

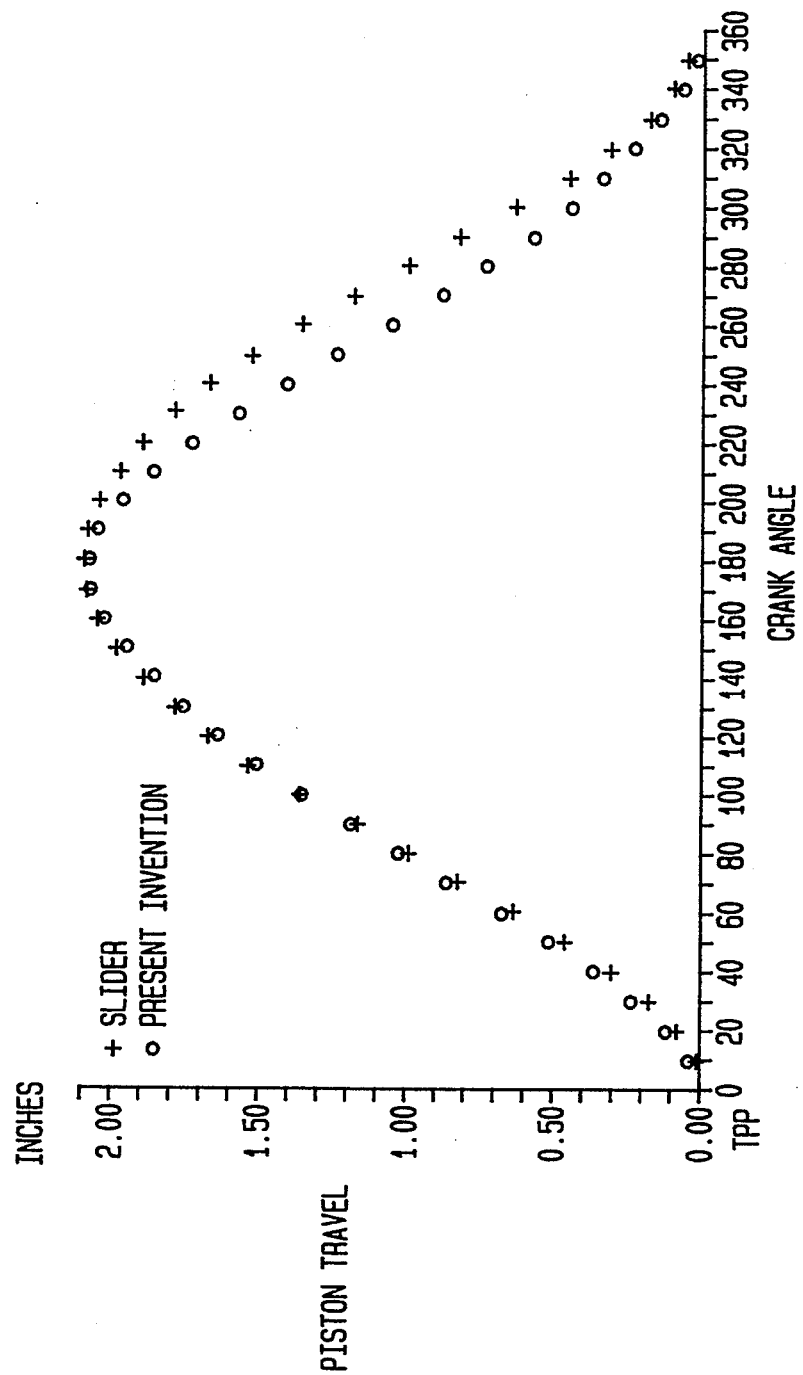

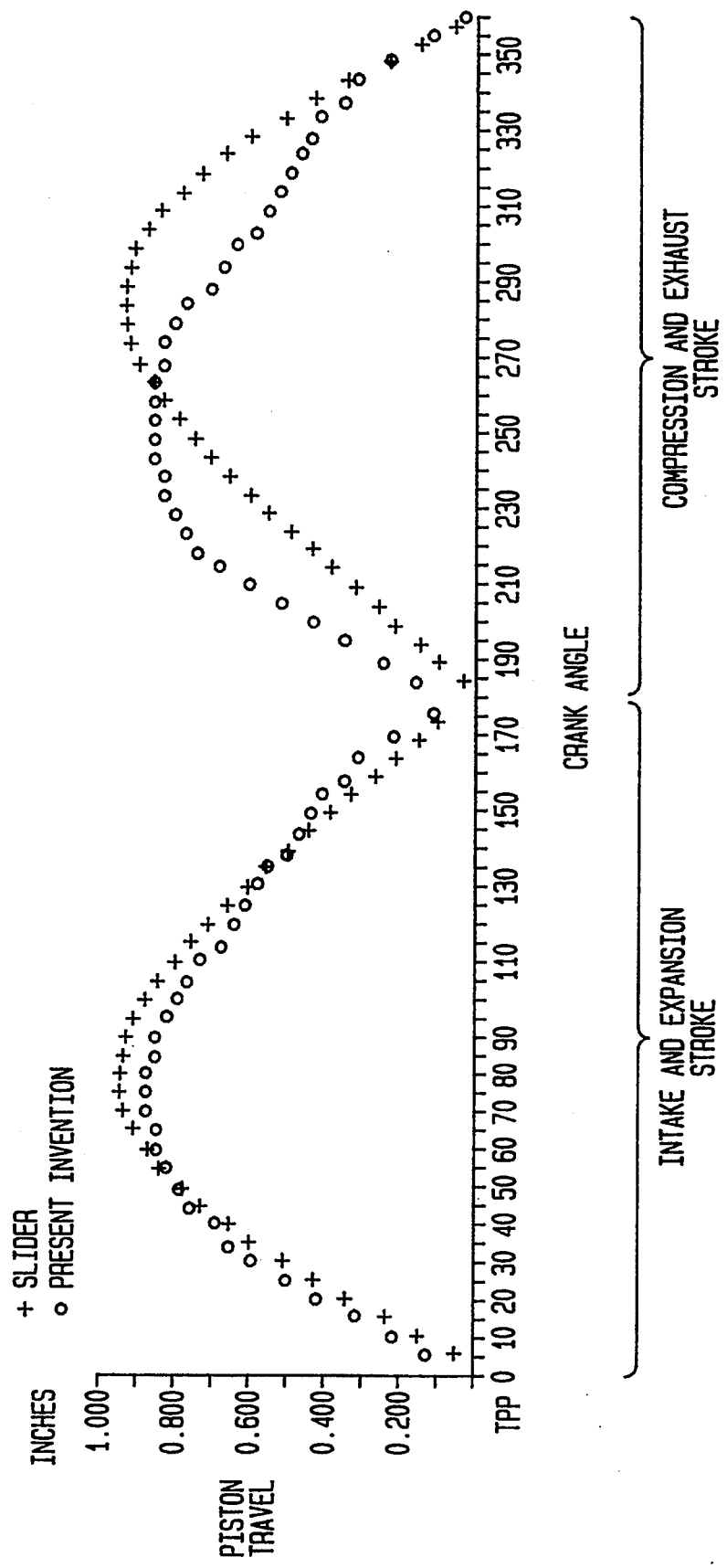

INTERNAL COMBUSTION ENGINE WITH IMPROVED CYCLE DYNAMICS

FIELD OF THE INVENTION

The present invention relates to internal combustion engines, and more particularly to reciprocating piston engines utilizing scotch yoke rectilinear-to-rotary motion translation wherein the cycle dynamics may be altered to match the thermodynamics of combustion yielding a more efficient engine and lowering pollutants in the engine exhaust.

DESCRIPTION OF THE PRIOR ART

Numerous engine designs have been proposed over the years for achieving various performance characteristics. The most familiar design is the conventional reciprocating piston internal combustion engine. Typically, the reciprocating piston engine utilizes a connecting rod to connect the piston(s) to the offset crankpins of a crankshaft thereby translating the linear reciprocating motion of the pistons to rotary motion. The connecting rod is articulable at both ends relative to the piston and the crankpin. At the piston end of the connecting rod, a wrist pin passes through the piston and the connecting rod joining them. This design is known in the art as the slider crank engine. While the slider crank design has proven to have great utility, it does have certain disadvantages and limitations. For instance, the number and weight of the parts of the engine, as well as the exterior dimensions for a particular displacement, appear to have been reduced to a near minimum. Further, it is not likely that power loss due to friction will be significantly reduced owing to the side loading of pistons and the pendulous motion of the connecting rods. In addition, pumping losses and other intrinsic inefficiencies occurring during each stroke of the cycle are not likely to be improved due to the fixed cycle dynamics of the slider crank engine, wherein the Top Dead Center (TDC) position of the crankshaft invariably corresponds to Top Piston Position (TPP) in the cylinder and the Bottom Dead Center (BDC) position corresponds to Bottom Piston Position (BPP).

Of course, the cycle dynamics of an engine (piston) position/velocity and cylinder volume/rate of volume change as a function of crankshaft position) has a direct effect upon the thermodynamics of the engine in terms of power and efficiency and upon the chemical reactions driving the engine (exothermic oxidation of fuel) in that the cycle dynamics effect the pressure/temperature and rate of change thereof in the reaction vessel. Each of the foregoing determine the equilibria established during operation of the engine and the nature of the exhausted end products of combustion.

A variety of expedients for improving the slider crank engine have been considered over the years, including devices for altering the cycle dynamics of the engine. For example, the following devices have been proposed: pistons with variable compression height, see U.S. Pat. No. 4,979,427; connecting rods with variable length, see U.S. Pat. No. 4,370,901; connecting rods with a pair of wrist pins, one of which is connected to an internal slider and the second of which traverses an arcuate slot, see U.S. Pat. No. 4,463,710; and supplemental pistons and cylinders converging into a shared combustion chamber, see U.S. Pat. No. 3,961,607. Each of these devices results in a more complex engine having more parts and greater reciprocating and total mass.

The scotch yoke has been employed in certain engine designs seeking improved cycle dynamics over the slider crank engine. For example, see U.S. Pat. Nos. 4,584,972, 4,887,560, 4,485,768 and 4,803,890. While these efforts certainly must be considered creative, they either utilize a great number of parts in a complex arrangement or are plagued by certain weaknesses encountered in the traditional scotch yoke design. In the traditional scotch yoke engine, the pistons are connected by a rigid, non-articulable connecting rod to a shuttle having a slot therein which accommodates the crankpin of a crank shaft. The motion of the shuttle is constrained to a linear path by guide surfaces and the crankpin slides within the slot as the crankshaft rotates through its range of motion. Thus, the scotch yoke provides a means for converting the reciprocating linear piston motion to rotary crankshaft motion. The slot within the shuttle must be at least as wide as the crankpin diameter and at least as long as the diameter of crankpin travel. A pair of competing objectives in the design of scotch yokes is to eliminate friction, as well as clearance at the crankpin/slot interface. Friction results in energy loss in the conversion from linear to rotary motion and also in wear of the scotch yoke. Clearance at the interface results in a loss of motion translation (rotary to linear and vice versa), i.e., there is no translation during traversal of the clearance gap, and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

A variety of methods have been proposed to simultaneously achieve minimum crankpin to slot clearance and friction. For example, in U.S. Pat. No. 1,687,425 a spring urged lever presses against the crankpin to eliminate excess clearance. In U.S. Pat. No. 2,366,237 the shuttle includes a bearing block having a center roller bearing for the crankpin and side roller bearings to reduce friction between the block and the remainder of the shuttle. U.S. Pat. No. 4,685,342 to Douglas C. Brackett, the inventor herein, entitled DEVICE FOR CONVERTING LINEAR MOTION TO ROTARY MOTION VICE VERSA, discloses a scotch yoke device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot when the crankpin is inserted into the slot. In this manner, clearance at the crankpin/slot interface can be minimized to manufacturing tolerances and friction is reduced to the rolling friction of a roller bearing. The inventor herein has recently proposed additional solutions to this traditional problem inherent in the scotch yoke design. In his U.S. Pat. No. 5,259,256 entitled Motion Converter With Pinion Sector/Rack Interface, there is disclosed a simple and effective arrangement wherein a pair of opposing gear racks disposed within the shuttle slot capture a pair of free floating sector segments disposed about the crankpin of the crankshaft to be turned.

The present application then seeks to provide a new and novel engine having improved cycle dynamics which employs a type of scotch yoke motion translator.

It is an object to produce a highly efficient engine having a high power to weight ratio, reduced friction and pumping losses, which uses a minimum of moving parts, and which also has reduced pollution emissions.

SUMMARY OF THE INVENTION

The problems and disadvantages associated with conventional reciprocating piston internal combustion engines are overcome by the present invention which includes a reciprocating piston internal combustion engine having a cylinder for slideably receiving a corresponding mating piston therein moving in synchronous reciprocation relative to the rotation of a crankshaft. A shuttle having an aperture therein is affixed to the piston, with the aperture receiving a crankpin of the crankshaft for interconverting between reciprocating motion of the piston and rotary motion of the crankshaft. At least a portion of the peripheral boundary defining the aperture has a trackable profile. A pair of tracking sectors are independently rotatably mounted side-by-side upon the crankpin. The tracking sectors have a lobed portion for engaging the trackable profile and a cap portion for retaining the sectors upon the crankpin.

BRIEF DESCRIPTION OF THE FIGURES

For a better understanding of the present invention, reference is made to the following detailed description of an exemplary embodiment considered in conjunction with the accompanying drawings, in which:

FIG. 4B is a side view of the sector gear shown in FIG. 4a;

FIG. 9 is a graph of piston position (travel) vs. crank angle for a fourth exemplary embodiment of the present invention, as compared to a slider crank engine with an equivalent stroke;

FIG. 10 is a graph of piston acceleration/deceleration during the intake/expansion and compression/exhaust stokes, respectively, comparing the fourth exemplary embodiment of the present invention graphed in FIG. 9 and the slider crank engine graphed in FIG. 9;

DESCRIPTION OF THE EXEMPLARY EMBODIMENTS

Figure 1A:
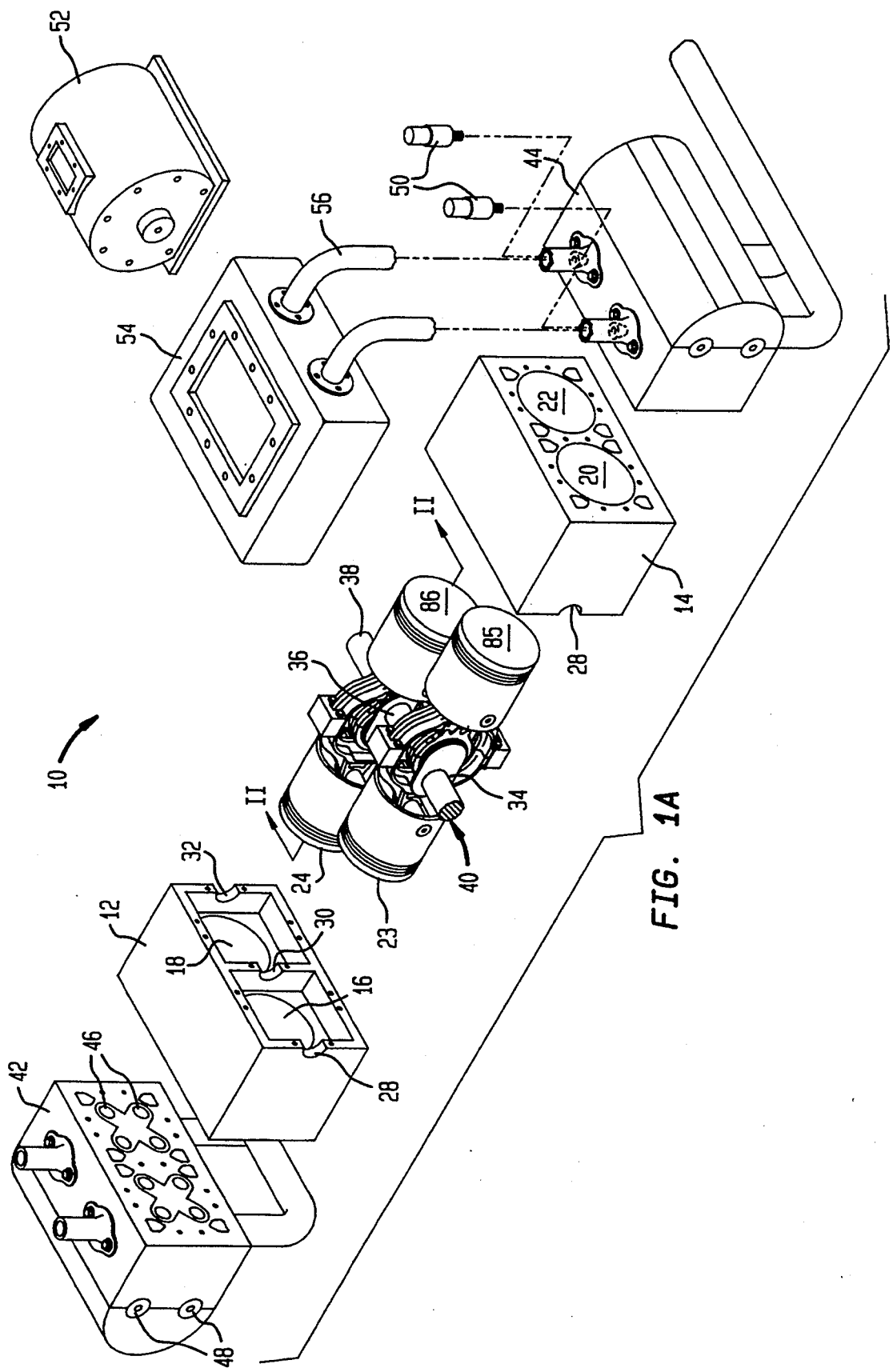
FIG. 1A is an exploded perspective view of a first embodiment of the present invention.

FIG. 1A shows an engine 10 constructed in accordance with the present invention. The engine 10 has a pair of horizontally opposed cylinder blocks 12, 14 each having a pair of cylinders 16, 18 and 20, 22 for slideably receiving corresponding pistons 23, 24, 25 and 26 therein. Three main bearings 28, 30 and 32 receive the main bearing journals 34, 36 and 38 of a crankshaft 40 therein when the blocks 12 and 14 are assembled. Bearing inserts, surface treatment, etc. may be employed in a conventional manner but for simplicity of illustration are not depicted. As in conventional opposed engines, the cylinder blocks comprising the crankcase are held together by suitable studs or through bolts (not shown). A pair of conventional cylinder heads 42, 44 are affixed to the cylinder blocks 16, 18 in a manner as would be known in the an. In the embodiment shown, the heads 42, 44 have four valves 46 per cylinder and are actuated by a pair of overhead camshafts 48. Fuel/air supply is conventional, being accomplished, for example, by fuel injectors 50, as shown in the embodiment depicted. Alternatively, a carburetor system could be used. A supercharger 52 may be used with the present invention to improve volumetric efficiency and thereby more closely realize the optimum fuel air mixture over the operable range of RPMs. The cycle dynamics of the invention may be designed to utilize a supercharger more effectively than a comparable slider crank engine as shall be discussed more fully below. The supercharger 52 would discharge into an air plenum 54, the pressurized air being distributed to the cylinders via runners 56. The means by which the reciprocating linear motion of the pistons is converted to rotary crankshaft motion shall now be described in reference to FIG. 1B which shows the crankshaft 40 having a pair of offset crankpins 58, 60 upon each of which may be installed a pair of split rotatable sector gears having a lobed portion 62, 64 and a cap portion 66, 68. The lobed portions 62, 64 are assembled to the cap portions 66, 68 by through bolts and mating nuts as shown, or in another conventional manner, such as providing a threaded aperture in one or the other portion to receive a bolt. As could be expected, the interior peripheral surface of the lobe and cap portions may be adapted to receive a bearing insert or some other friction reducing coating to allow a close fit to the crankpin while remaining freely rotatable thereon. The crankshaft 40 is basically conventional and equivalent to that which would be used in a slider crank engine. Dimensionally, however, the crankshaft 40 would be customized to the present invention with respect to bearing journal and crankpin diameter and width, as well as, counter weight dimensions. A pair of A-shaped connecting rods 70, 72 hereinafter "A-rods". attach at their respective legs to form a shuttle assembly disposed about each crankpin 58, 60. A rack 74, 76 attaches to each A-rod and engages an associated sector gear lobed position 63, 64 when the A-rods, e.g., 70, 72 are assembled together to form a shuttle assembly as is shown in FIG. 2. The interaction between the crankshaft sector gears and racks accounts for the conversion of linear piston and shuttle motion into crankshaft rotation as can be appreciated most easily by examining FIGS. 8A-8D and the corresponding description as shall be set forth below. A gusset box 78, 80 may be employed to provide a strong joint between the A-rods 70, 72 making up the shuttles. In the alternative, the shuttle assemblies can be formed as a unit as shown in the embodiment depicted in FIGS. 7 and 8A-8D. In that instance, the shuttle assemblies could be designated "O" rods. Pistons 23, 25 are attached to respective A-rods 72, 70 via conventional wristpins 82. While the pistons need not articulate on wristpins as in slider crank engines, this mode of connection was employed because it represents a utilization of existing technology, i.e., existing pistons and wrist pins. In the alternative, the pistons could be solidly bolted to the A-rods or O-rods or made integrally with them.

Figure 1B:
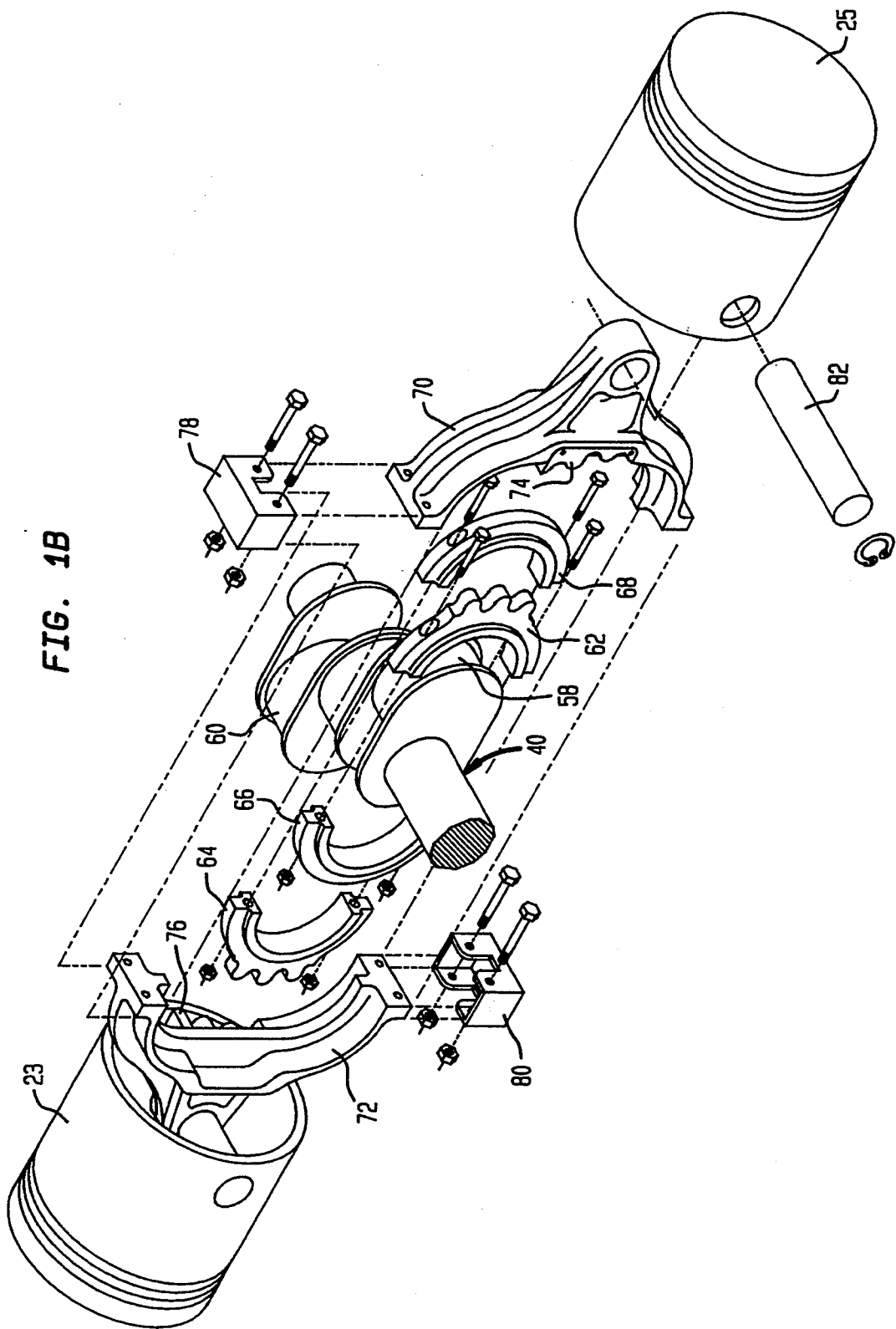
FIG. 1B is an enlarged exploded perspective view of the crankshaft and piston assembly shown in FIG. 1A.
Figure 2:
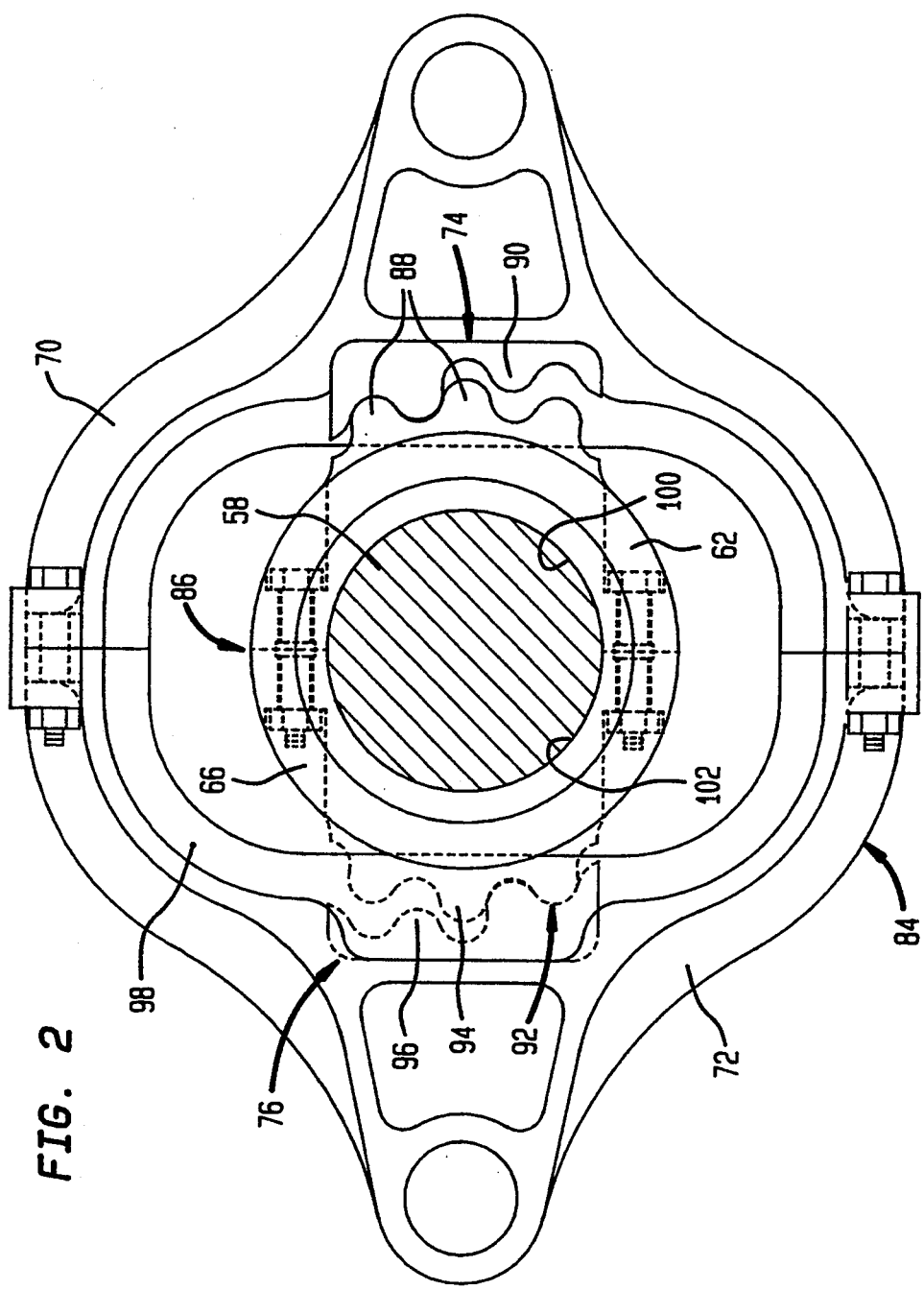
FIG. 2 is a partially cross-sectional view in elevation of the crankshaft and A-rod assembly depicted in FIG. 1A taken along line II—II and looking in the direction of the arrows.

Given the overall design depicted in FIGS. 1A and 1B, it can be anticipated that the present invention will exhibit certain beneficial attributes of scotch yoke engines. For example, like other scotch yoke designs, this design, by eliminating connecting rods, substantially reduces side thrust of the piston(s) against the cylinder wall since the shuttle travels in a straight line with the side loads being divided approximately equally between two pistons. This results in a reduction in the frictional losses due to piston side loading. Further, since there is a reduction in side loading, a better seal can be effected by the piston rings. Better ring seal prevents blowby and the attendant HC pollution and dilution of engine lubricant with fuel. Reduced side loading also permits a smaller piston skirt to be employed thereby shaving weight from the reciprocating mass and increasing engine performance and efficiency. The present invention also has the balance characteristics of scotch yoke engines which exceed the pendulous slider crank engine, eliminating the need for expensive counter-rotating balance shafts which have come into common use. In addition, the benefits of decreased engine size are realized in accordance with the general rule that scotch yoke designs are smaller than slider crank engines of equal displacement. It should be understood that while a four cylinder engine is depicted in the present application, any number of cylinders could be employed, such as two, six or eight cylinder configurations.

FIG. 2 shows a shuttle assembly 84 having two A-rods 70, 72 installed over a crankpin 58 of crankshaft 40. A pinion sector gear 86 formed by joining lobed portion 62 and cap portion 66 is positioned on the crankpin 58. The lobes (teeth) 88 of the sector gear 86 mesh with the mating teeth or lobes 90 defining a trackable profile of a corresponding rack 74. A second pinion sector gear 92 having lobed portion 64 and cap portion 68 (not visible in this view) is mounted on the same crankpin 58 and oriented such that the lobes 94 thereof mesh with the lobes 96 of rack 76. The lobes 94 and rack 76 are shown in dotted lines to indicate that the would be obscured from view by strengthening rib 98. It should be noted that the present invention is not intended to be restricted to any particular form of rack and sector gearing as might be implied from the traditional definition of these terms. For example, FIGS. 1A-5 depict concentric (pitch line concentric with axis of rotation), tri-lobed, epicycloidal/hypocycloidal pinion sector gears, e.g. 86, and mating, hypocycloidal/epicycloidal gear racks, e.g., 74, which have a pitch line inclined from the perpendicular of the direction of reciprocating motion. The epicycloidal/hypocycloidal shape of the sector gears and racks allow greater loading in the direction perpendicular to the respective pitch lines than conventional gearing. As can be appreciated in FIG. 2, the area of contact between sector gears and racks is substantially increased over, e.g., the line contact of a round crankpin or roller bearing upon a flat slot surface as might occur in traditional scotch yoke designs. This results in the potential of the linear-to-rotary conversion means of the present invention to endure greater normal loading forces, thereby permitting an increased power density. The epicycloidal/hypocycloidal and hypocycloidal/epicycloidal arrangement depicted herein can also support greater loading forces directed along the line perpendicular to the pitch line than would gear shapes which are intended to transfer torsional forces acting parallel to the pitch line. The above described U.S. Pat. No. 5,259,256 entitled Motion Converter With Pinion Sector/Rack Interface discloses a variety of pinion sector gear shapes and mating rack trackable profiles, which patent is incorporated herein by reference.

After all the various embodiments of the present invention, as well as those rack and pinion combinations disclosed in the aforementioned patent are considered, it should be apparent that the racks and the pinion sector gears can be configured in a variety of ways. In each instance, however, it is an objective to prevent scuffing and to provide an adequate load bearing support surface. Scuffing of the surfaces is avoided when the pinion sector gears track along the profiles of the racks without loss of contact or slippage throughout the range of motion of the device. The racks, e.g., 74, 76 thus constitute trackable profiles with respect to the pinion sector gears 86. 92. In addition, one could observe that the total circumferential length of the trackable profile of each of the racks preferably equals the total circumferential length of the corresponding pinion sector gear which tracks over it.

The racks and the pinion sector gears may be formed of hardened steel or other materials as commonly used to form gears and may include surface treatments to reduce wear, friction and production costs e.g., electroplating, nitriding, spray dispersement and, in general, any known metallurgical or coating process). The weight of the racks and pinion sector gears could be reduced by forming them as a multi-material matrix of aluminum and steel or other metal or non-metal matter. The bearing surfaces. e.g., 100, 102 of the lobed portion 62 and cap portion 66 of pinion sector gear 86 may be similarly enhanced by surface treatment or bonding with a friction-reducing bearing material.

In the engine described above, the shuttle assemblies, e.g., 84 are confined to a rectilinear path by the cylinders 16, 18, 20, 22 and the pistons 23, 24, 25, 26 rather than by an independent guide acting upon the shuttles proximate the yoke portion of the shuttle assembly. While tracking profiles of the pinion sector gears act as self-aligning interfaces as they mesh with their respective racks, a guide, as would be known from prior art scotch yoke devices, could be employed to further insure rectilinear motion of the shuttles and relieve the pistons and cylinders from side loading forces.

Figure 3:
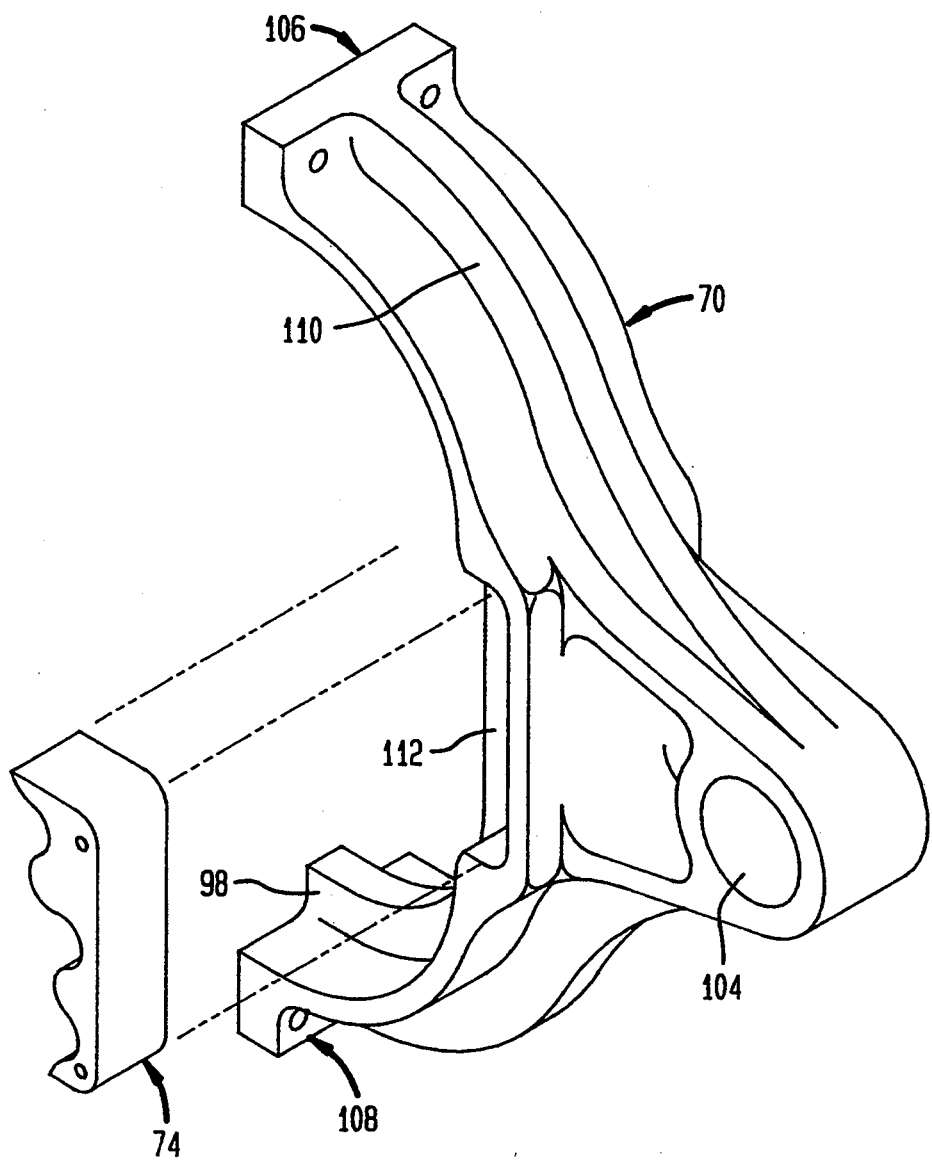
FIG. 3 is an enlarged exploded perspective view of an A-rod and rack constituting one-half of the A-rod assembly depicted in FIG. 2.

FIG. 3 shows an A-rod 70 and associated rack 74 in greater detail. As can be seen, there is some similarity to a standard connecting rod shape, in that there is a converging end which is penetrated by a bore 104 for accommodating a wrist pin and two diverging legs 106, 108 which are connected to the legs of another A-rod to form a shuttle assembly. The A-rod 70 may be provided with exterior strengthening ribs 110 and interior ribs 98 to provide tortional rigidity. The A-rod 70 has a recess 112 for accommodating the rack 74 therein. A pair of through bolts or other equivalent conventional means retains the rack 74 in association with the A-rod 70.

Figure 4A:
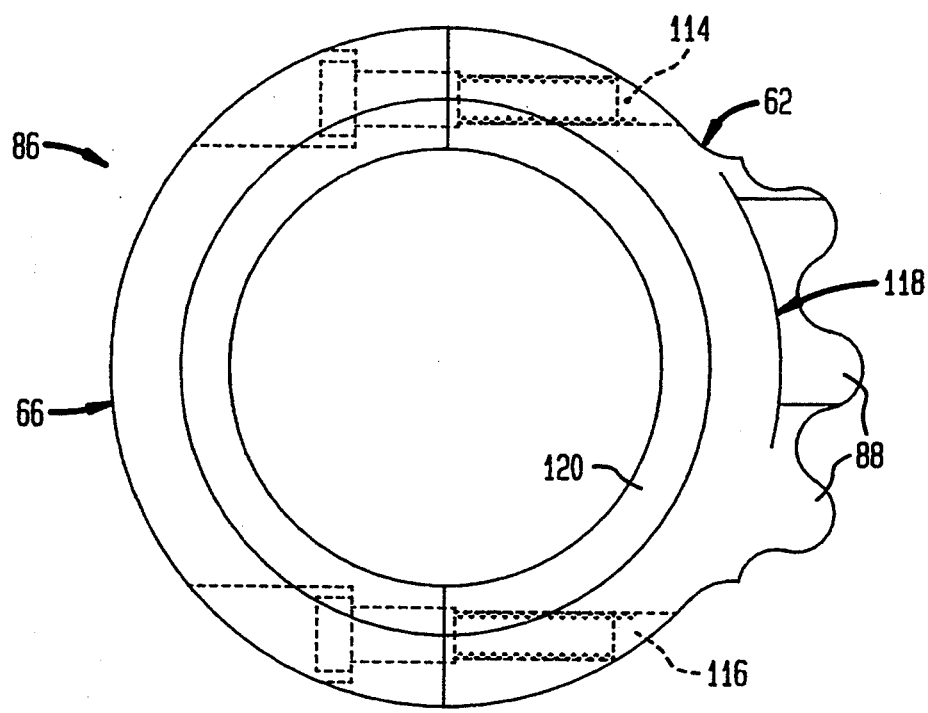
FIG. 4A is an enlarged elevational view of a sector gear as depicted in FIG. 1.
Figure 4B:
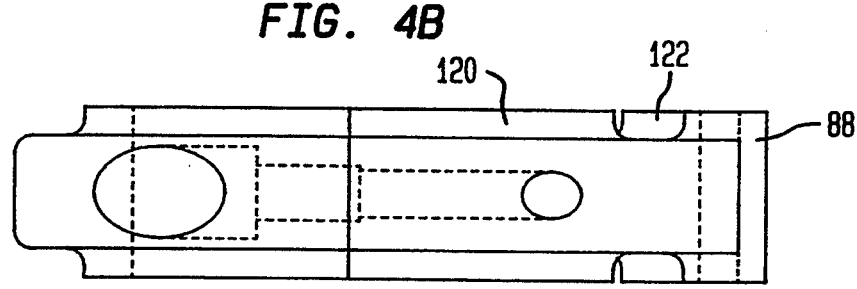

FIG. 4A shows a sector gear 86 of FIGS. 1B and 2 enlarged. The gear 44 is centrally split into lobed portion 62 and cap portion 66 to allow tight fitting and removal from a suitable crankpin. In this Figure, the lobed portion 62 has a pair of threaded apertures 114, 116 for receiving bolts passing through the cap portion 66. As before, the lobes 88 of the lobed portion 62 are three in number and epicycloidal/hypocycloidal in shape. The pitch line 118 of the sector gear 86 is concentric with the crankpin upon which it is installed. An annular bearing prominence 120 facilitates adjacent sector gears to counter-rotate relative to one another in sliding contact when pairs are installed on a single crankpin. FIG. 4b shows a relief groove 122 between prominence 120 and lobes 88 which permits lubricating oil to flow therethrough.

Figure 5:
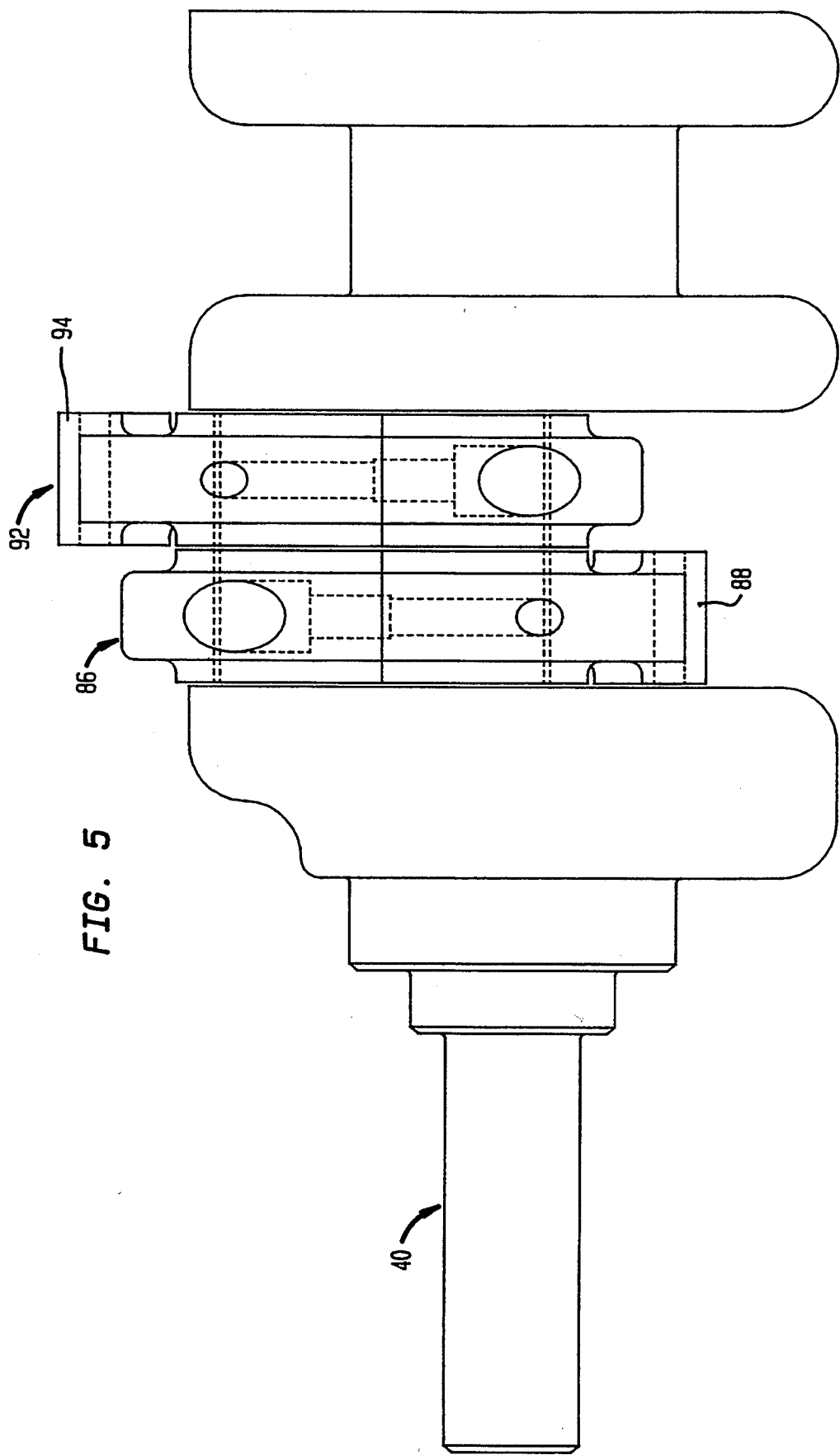
FIG. 5 is an enlarged side view of the crankshaft and assembled sector gears depicted in FIG. 2.

FIG. 5 illustrates a pair of sector gears 86, 92 installed on a crankpin (shown in dotted lines) of crankshaft 40. The sector gears 86, 92 are rotatable through 360 degrees about the crankpin and are rotatable independently of each other. In the position depicted, the lobes 88, 94 point in opposite directions ready to engage racks disposed on either side of the yoke portion of a shuttle assembly.

Figure 6B:
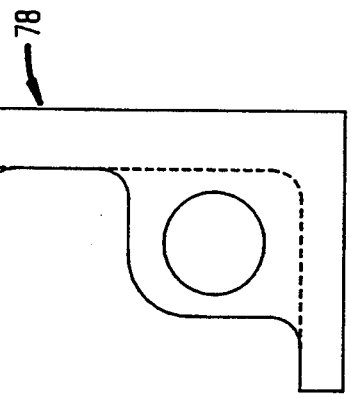
FIG. 6B is a side view in elevation of the gusset box depicted in FIG. 6A.
Figure 6A:
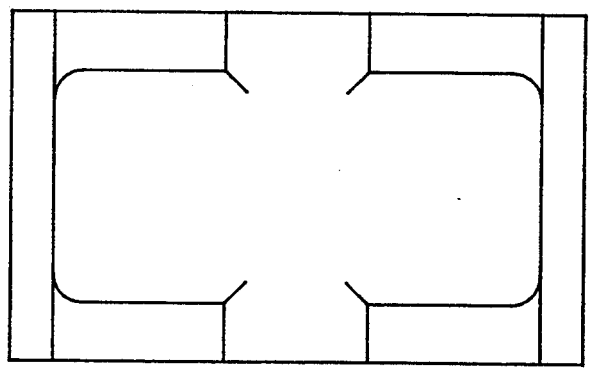
FIG. 6A is an enlarged plan view of an A-rod assembly gusset box as shown in FIG. 2.
Figure 6C:
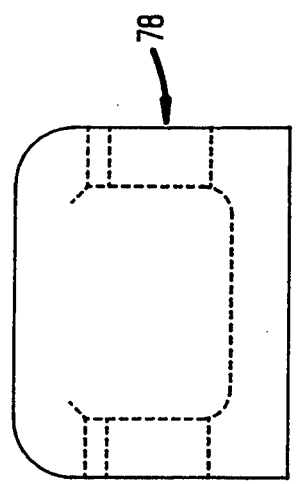
FIG. 6C is an end view in elevation of the gusset box shown in FIGS. 6A and 6B.

FIG. 6A-6C depict the gusset box 78 shown in FIG. 1. The gusset box 78 is preferably a steel forging and provides support to and stiffens the connection of A-rod legs, e.g., 106 to form a rigid shuttle assembly. As mentioned above, the shuttle can be made as a single unit, such as an aluminum casting.

Figure 7:
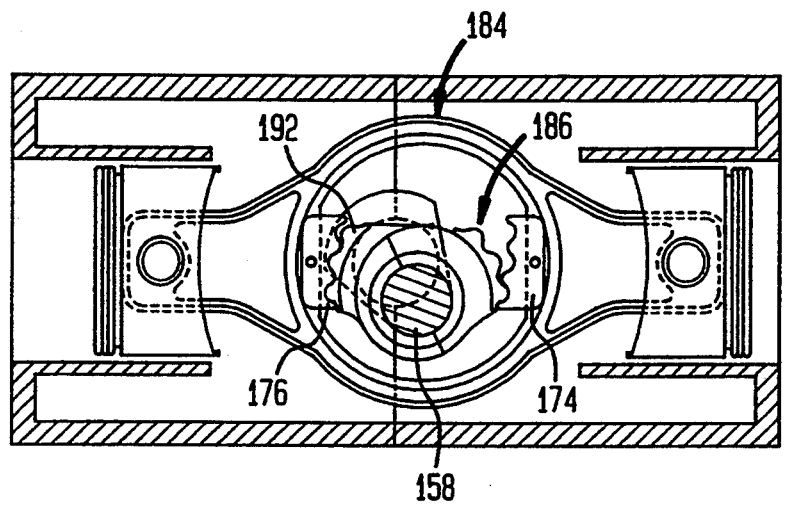
FIG. 7 is an enlarged view of a crankshaft and yoke assembly in accordance with a second exemplary embodiment of the present invention.

FIG. 7 shows an alternative embodiment of the present invention wherein the shuttle assembly 184, rather than being composed of a pair of A-rods, is a unitary "O" rod mono-lithically casted or forged. In the remaining description of the figures, the following reference numeral convention will be followed. Corresponding elements shall be given the same reference number incremented by one hundred. Corresponding elements have the same structure and function unless otherwise noted or illustrated. Referring again to FIG. 7, it can be seen that the pinion sector gears 186, 192 have a pitch line which is eccentric to the crankpin 158. Racks 174, 176 have a pitch line which is perpendicular to the line of linear reciprocating motion of the shuttle 184. This configuration illustrates one of many sector/rack combinations which can be utilized to achieve desired cycle dynamics thereby realizing enhanced operation over the slide crank engine as more fully discussed below.

Figure 8A:
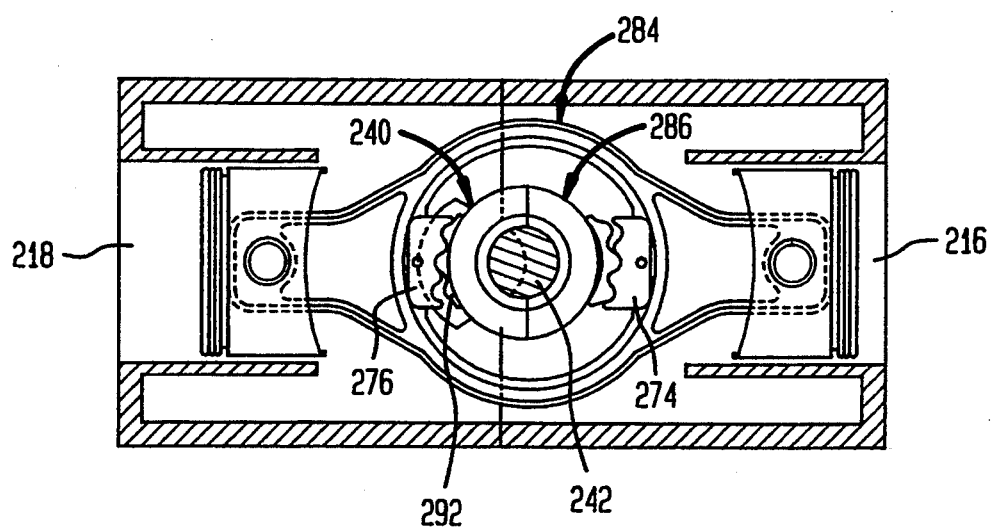
FIGS. 8A-8D are a series of schematic elevational views of a third embodiment of the present invention as it moves through a portion of its range of motion.
Figure 8B:
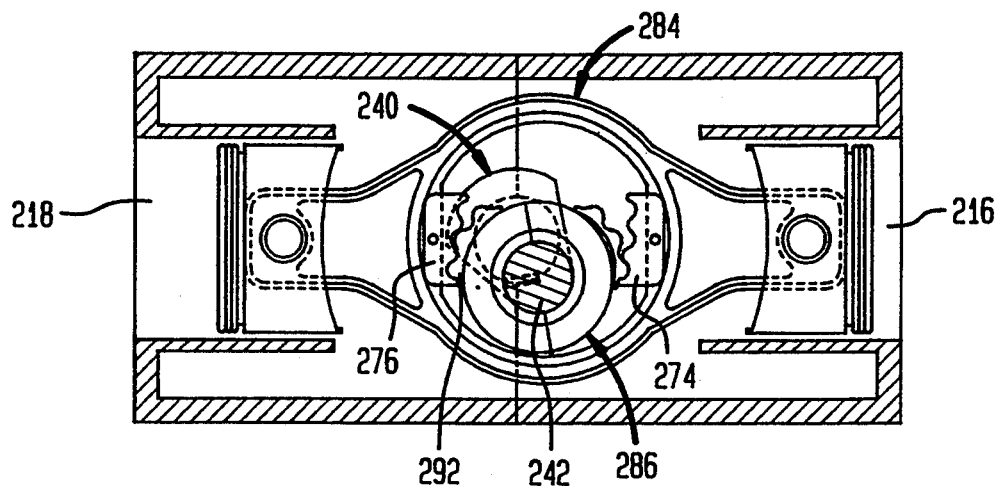
Figure 8C:
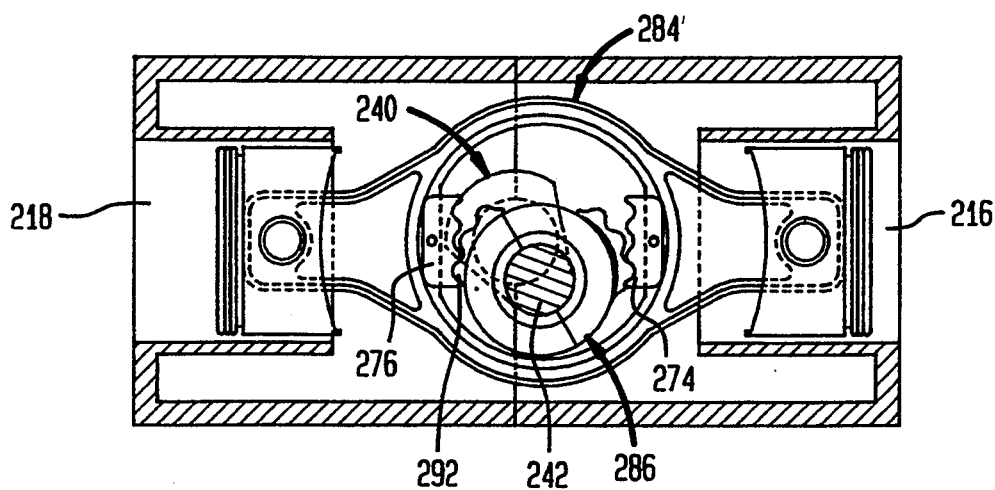
Figure 8D:
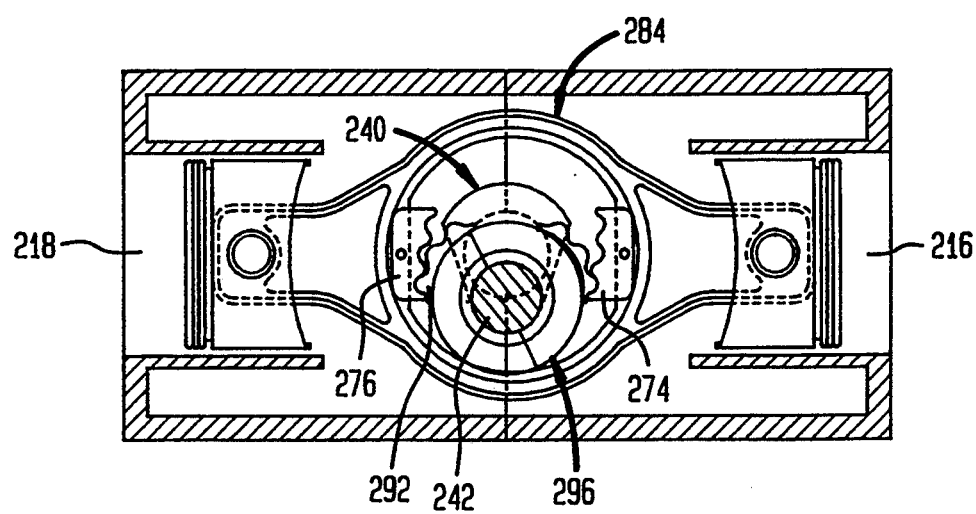

FIGS. 8A-8D show a third exemplary embodiment of the present invention having concentric sector gears 286, 292 and racks 274, 276 having a positive, left to right slope at four different positions during the travel of the crankshaft 240 through 90 degrees of rotation. FIG. 8A shows the crankpin 242 at 0 or 360 degrees relative to the axis of the cylinders 216. 218. FIG. 8B shows the crankpin 242 at 30 degrees beyond the axis of the cylinders. In FIG. 8C, the crankpin 242 is 60 degrees beyond the axis and, in FIG. 8D, the crankpin 242 has progressed 90 degrees.

As the crankshaft 240 rotates, the crankpin 242 moves up and down within the yoke opening of the shuttle 284 relative to the axis of the cylinders 216, 218 (i.e., in a vertical direction). The horizontal component of crankpin 242 motion is translated into the rectilinear motion of the shuttle 284. The crankpin 242 is captured within the pinion sector gears 286, 292 and is therefore prevented from contacting the interior periphery of the shuttle 284. The pinion sector gears 286, 292 pivot about the crankpin 242 as the crankshaft 40 rotates, the racks 274, 276 being immovable in the direction perpendicular to the linear path of the shuttle 284. The pinion sector gears 286, 292 pivot in opposite directions and can therefore be said to be counter-rotating. The crankpin 242, assuming that it has an axial offset "r" from the crankshaft 240, causes a reciprocating linear motion of the shuttle of magnitude $2r$, ranging from $-r$ to $+r$.

The cycle dynamics of the present invention as shown in FIGS. 8A-8D are altered from that of the slider crank engine due to the inclined pitch line of racks 274, 276. By inclining the pitch line of the racks from an orientation perpendicular to the cylinder axis, a cycle having, e.g., a 15 degree offset from a slider crank cycle can be obtained. In that instance, the following correspondence of piston position to crank angle would exist as compared to a slider crank engine.

| INTAKE & COMBUSTION PRESENT INVENTION crank angle (degrees) | SLIDER CRANK crank angle for same piston position |
|---|---|
| 15 | 0 |
| 54 | 44 |
| 76 | 64 |
| 95 | 82 |
| 116 | 100 |
| 142 | 124 |
| 195 | 180 |
| 195 | 180 |
| 234 | 236 |
| 256 | 260 |
| 275 | 278 |
| 296 | 296 |
| 322 | 316 |
| 15 | 360 |

Given this particular example of the present invention with a 15 degree offset, the effect on cycle dynamics and engine operation will now be considered. FIG. 9 is a graph of piston position as a function of crankshaft degrees after top piston position (TPP), being 0 degrees for the crank slider and 15 degrees for the embodiment of the present invention under consideration. When the crankshaft has travelled 180 degrees after TPP, for the present invention, the crankshaft will be at 195 degrees and the piston will be at bottom piston position (BPP). Note that TPP would occur at 0 degrees for the crank slider. As illustrated in FIG. 9, the relationship between piston position and crank angle is different at most points throughout the cycle from TPP to BPP and back to TPP for the present invention as compared to the slider crank. This condition causes a corresponding change in piston velocity and acceleration at any particular point in the cycle.

FIG. 10 shows piston acceleration/deceleration for the present invention and the slider crank during the intake and combustion (expansion) strokes and during the compression and exhaust strokes. In FIG. 10 the ordinate line is a measure of distance the piston has moved from one point to the next for each 5 degree movement in crank rotation past TPP.

The differences in cycle dynamics illustrated in the foregoing graphs have an impact upon certain basic performance characteristics of the engine, such as pumping losses and volumetric efficiency. Besides the friction due to mechanical crankcase components and piston against cylinder, there is a large friction loss in reciprocating piston engines attributable to intake and exhaust throttling, that is, the energy required to draw the fuel air charge into the combustion chamber and the energy required to pump the exhaust gases out of the cylinder. These friction losses are related to volumetric inefficiency and incomplete exhaust removal which further contribute to poor engine performance. It is well known that the better an engine "breathes" the more powerful and efficient the engine is. Besides the restrictions on volumetric efficiency caused by the shape and dimensions of the manifold and valve ports, the cycle dynamics of the slider crank engine also limit volumetric efficiency. The present invention with altered cycle dynamics can achieve a higher volumetric efficiency than the slider crank by increasing piston acceleration after TDC as exhibited by FIG. 10. The greater piston acceleration after TDC establishes an increased pressure differential between that which exists in the cylinder as compared to that which exists outside the cylinder.

Numerous variations in cycle dynamics may be accomplished by changing the shape, inclination and/or concentricity of the sector and racks. It is possible, e.g., to dwell the piston at TPP and exert maximum pressure when the crank is in excess of 40 degrees past TDC. Conversely, it is possible to design the racks and pinion sector gears so that top piston position occurs before the crank arm moves to zero degrees and to accelerate the piston during the degrees of rotation past TDC. This flexibility in cycle dynamics allows the engine to be tailored for different fuels.

If an offset of 15 degrees between the zero degree point and the TPP is effected as previously described, piston dwell will begin at 9 degree and continue until 15 degrees. Because TPP occurs 15 degrees beyond the zero degree mark, the advanced crank arm of the present invention provides slightly increased volume for each additional degree of crank rotation as compared to the slider crank engine. An increased dwell at TPP also permits greater induction of fuel air mixture resulting in an increase in volumetric efficiency. An increased dwell at BPP allows more of the unburned exhaust gas to escape from the exhaust valve reducing the quantity of exhaust gas that must be pumped from the cylinder. This increase in volume per crank angle decreases the time for heat transfer from the combustion products and the cylinder and piston. For this reason, a greater portion of the combustion energy is available for useful work. With extended dwell time at TPP and BPP, slightly accelerated volume progression and the possibility of improved ignition characteristics, a more uniform, lower combustion temperature gradient is feasible. This lower temperature gradient reduces the non-equilibrium reaction of nitrogen and oxygen caused at high peak combustion temperature as well as the dissociation of $CO_2$ into CO and $O_2$. Both nitrogen oxides NOx and carbon monoxide constitute serious pollutants. In general, both NOx and CO are reduced by reducing the combustion temperature. At high temperatures, $CO_2$ disassociates to a greater extent than at low temperatures and the amount of $CO_2$ progressively decreases in the equilibrium mixture as the temperature increases. Pressure has an effect upon the equilibrium reaction $CO + \frac{1}{2} O_2$ $CO_2$ in accordance with the principle of Le Chatelier-Braun, i.e., a system in chemical equilibrium attempts to counteract any change in pressure. Since the pressure is the sum of the partial pressures of the $CO_2$, the $O_2$ and the CO, an increased pressure favors the greater completion of reaction since the products require less volume than the reactants (1 mole of gas to each 1 and $\frac{1}{2}$ mole). Overall, the higher the temperature the greater the dissociation, the greater the pressure the less the dissociation. Similarly, the concentration of NOx compounds in exhaust gas can be reduced through reductions in temperature by, e.g., decreasing the charge temperature, by reducing compression ratio, through exhaust gas recirculation or by water injection. As has been shown above, the present invention permits the cycle dynamics of the engine to be altered such that a lower compression ratio can be employed to accomplish the same degree of compression occurring in a slider crank engine. Furthermore, in the present invention, the increased acceleration of the piston away from TPF on the expansion stroke prevents pressure and temperature buildup resulting from a flame front which greatly outpaces piston movement. In this manner, the temperature of combustion can be reduced and the rate of expansion of combustion products more closely matched with piston movement with a resultant increase in efficiency and a decrease in CO and NOx emissions.

In addition to the foregoing positive effects of offsetting the crank angle from TPP, an advanced angle also provides an increased moment arm upon which the piston can act. In the slider crank engine, peak compression occurs when the crankpin is disposed at zero degrees when there is no moment arm. As a result, the slider crank engine can do no work while the piston is at TPP. To compensate for this, the ignition is timed so that peak combustion pressure occurs at about 15 degrees after TDC. However, at 15 degrees after TDC, the compression ratio is much less than at TDC. For example, if a slider crank engine has a 9:1 compression ratio, at 15 degrees after TDC the compression ratio is only 5:1. The present invention, by allowing crank angle offsets from TPP, allows the compression ratio to be reduced and the creation of peak combustion pressure at TPP which can be made to correspond, e.g., to a 15 degree crank angle. Of course, if the compression ratio can be reduced to accomplish the same efficiency of combustion as is achieved in an engine using higher compression ratio, pumping losses are reduced.

Figure 11:
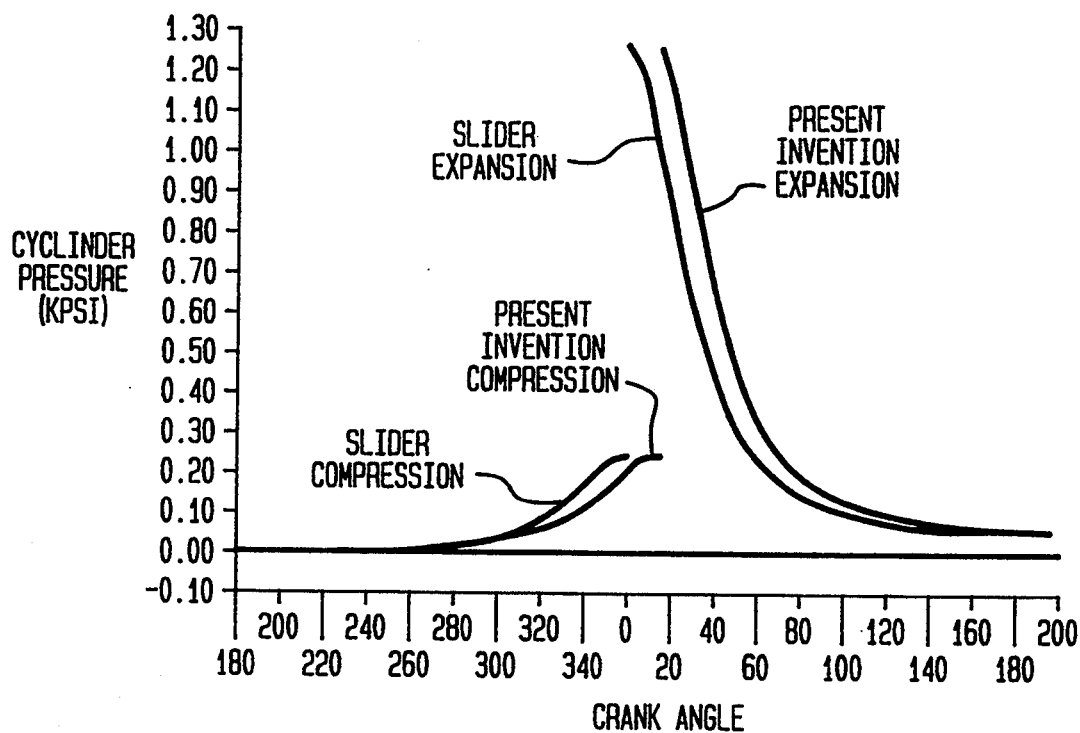
FIG. 11 is a graph of cylinder pressure vs. crank angle comparing the fourth exemplary embodiment of the present invention with the slider crank engine graphed in FIG. 9.
Figure 12:
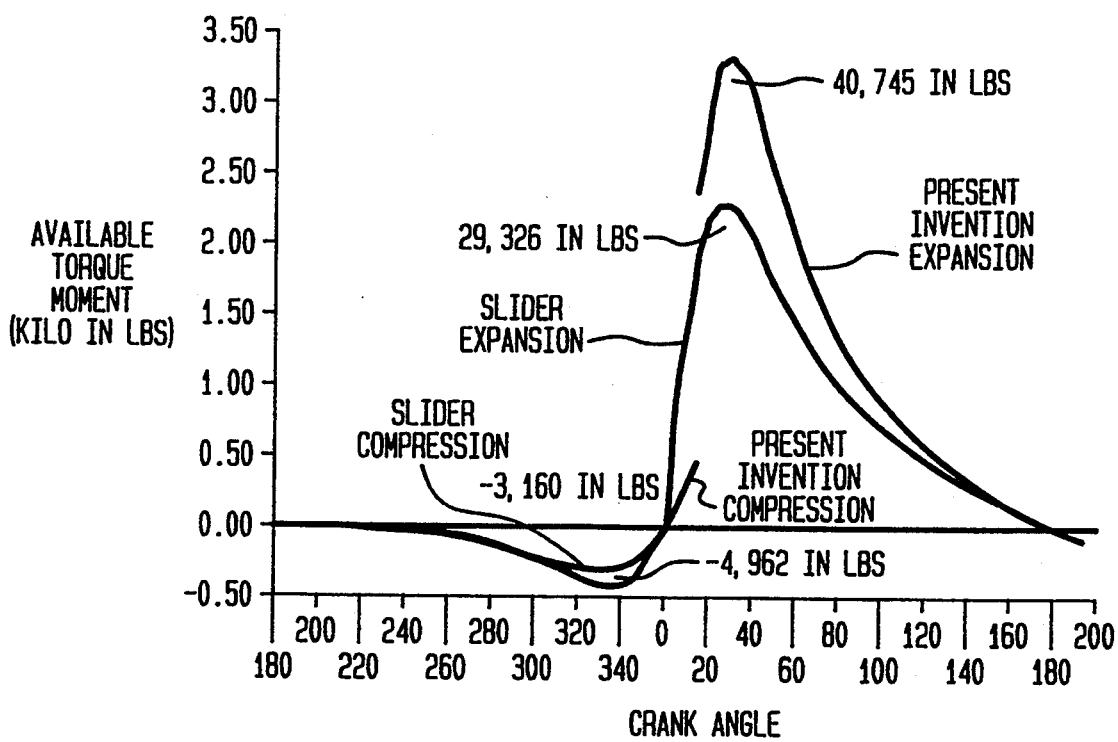
FIG. 12 is a graph of available torque moment vs. crank angle comparing the fourth exemplary embodiment of the present invention with the slider crank engine graphed in FIG. 9.

FIGS. 11 and 12 illustrate the effect of matching peak combustion pressure to an increased moment arm. FIG. 11 shows exemplary cylinder pressures for the present invention with a 15 degrees crank angle offset as compared to the slider crank engine during the compression and expansion (combustion) strokes. As can be appreciated from FIG. 11, the slider crank reaches maximum compression pressure at a crank angle of approximately 0 degrees which corresponds to TDC and TPP. The present invention reaches peak compression pressure at about 15 degrees which corresponds to the TPP. FIG. 12 shows the effect of providing an increased torque arm during peak combustion pressure.

Yet another positive effect from the alteration of cycle dynamics possible due to the rack and sectors of the present invention, is the potential effects upon compression efficiency. The present invention permits greater acceleration of the piston during the first degrees after BPP than can be accomplished with the slider crank engine. This leads to greater compression stroke efficiency in that during the early degrees after BPP when the gas density and pressure are low, the piston is moved further than in slider crank engines. When compression pressures increase, more degrees of crankshaft rotation are dedicated to further compression.

While the present invention has been described in terms of a sector/rack combination with a constant 15 degrees crank angle offset, it should be understood that the sector/rack are infinitely variable so that the cycle dynamics may be varied over a wide range.

It should be understood that the embodiments described herein are merely exemplary and that a person skilled in the art may make many variations and modifications without departing from the spirit and scope of the invention as defined in the appended claims.

I claim:

1. A reciprocating piston internal combustion engine having a cylinder for slideably receiving a corresponding mating piston therein moving in synchronous reciprocation relative to the rotation of a crankshaft, comprising:
   (a) a shuttle having an aperture therein affixed to said piston, said aperture receiving a crankpin of said crankshaft for interconverting between reciprocating motion of said piston and rotary motion of said crankshaft, at least a portion of a peripheral boundary defining said aperture having a trackable profile; and
   (b) a pair of tracking sectors independently rotatably mounted side-by-side upon said crankpin, said tracking sectors having a lobed portion for engaging said trackable profile and a cap portion for retaining said sectors upon said crankpin.

2. The engine of claim 1, wherein said portion having a trackable profile is divided into a pair of opposing portions disposed on opposing sides of said aperture, a first mating with a first of said pair of tracking sectors and the other mating with the other of said pair of tracking sectors.

3. The engine of claim 2, wherein said opposing portions of said trackable profile are displaced relative each other in a direction along the axis of said crankpin.

4. The engine of claim 3, wherein said tracking sectors are each rotatable through 360 degrees.

5. The engine of claim 4, further including means for removably attaching said lobed portion to said cap portion.

6. The engine of claim 5, wherein said means for removeably attaching includes a pair of threaded bolts.

7. The engine of claim 6, wherein said tracking sectors and said trackable profile have mating hypocycloidal/epicycloidal undulations.

8. The engine of claim 7, wherein said interconverting is characterized by an angular displacement of said crankshaft from 0 degrees at top piston position.

9. The engine of claim 8, wherein said displacement is about 15 degrees.

10. The engine of claim 7, wherein said undulations are uniform.

11. The engine of claim 10, wherein the pitch line of said undulations in said tracking sectors is concentric with the axis of rotation of said tracking sectors.

12. The engine of claim 10, wherein the pitch line of said undulations in said tracking sectors is eccentric with the axis of rotation of said tracking sectors.

13. The engine of claim 5, wherein said tracking sectors have a bearing surface in contact with said crankpin.

14. The engine of claim 3, wherein said opposing portions of said trackable profile are discrete elements affixed to said shuttle.

15. The engine of claim 3, wherein said shuttle is comprised of a single forged member.

16. The engine of claim 3, further comprising at least one additional piston/cylinder set, wherein said engine is horizontally opposed and said shuttle has a pair of outwardly extending arms radiating in opposite directions from said aperture in said shuttle, each of said arms receiving a piston attached thereto.

17. The engine of claim 3, wherein said shuttle is comprised of a pair of "A" shaped connecting rods attached together at their diverging legs.

18. The engine of claim 3, wherein said engine is a four stroke engine.

19. The engine of claim 3, wherein said engine is a two stroke engine.

20. The engine of claim 3, wherein said engine is a diesel.

* * * * *